US008361424B2

(12) United States Patent
Bouillon et al.

(10) Patent No.: US 8,361,424 B2
(45) Date of Patent: Jan. 29, 2013

(54) GAS DEACIDIZING METHOD USING AN ABSORBENT SOLUTION WITH DEMIXING CONTROL

(75) Inventors: Pierre-Antoine Bouillon, Lyons (FR); Marc Jacquin, Lyons (FR); Ludovic Raynal, Oullins (FR)

(73) Assignee: IFP, Cedex (FR)

( * ) Notice: Subject to any disclaimer, the term of this patent is extended or adjusted under 35 U.S.C. 154(b) by 0 days.

(21) Appl. No.: 12/564,984

(22) Filed: Sep. 23, 2009

(65) Prior Publication Data

US 2010/0104490 A1    Apr. 29, 2010

(30) Foreign Application Priority Data

Sep. 23, 2008    (FR) ..................... 08 05219

(51) Int. Cl.
*B01D 53/52* (2006.01)
*B01D 53/62* (2006.01)
*B01D 47/02* (2006.01)

(52) U.S. Cl. ........ 423/220; 423/223; 423/226; 423/228; 95/173; 95/175; 95/177; 95/179; 95/181; 95/183; 95/187; 95/235; 95/236

(58) Field of Classification Search .............. 423/210, 423/220, 223, 226, 228, 229; 95/149, 156, 95/172, 173, 174, 175, 177, 178, 179, 181, 95/183, 187, 230, 235, 236
See application file for complete search history.

(56) References Cited

U.S. PATENT DOCUMENTS

2004/0226441 A1   11/2004   Palmer

2006/0032377 A1   2/2006   Reddy et al.
2009/0199709 A1 * 8/2009   Rojey et al. ............... 95/46

FOREIGN PATENT DOCUMENTS

| FR | 2 898 284 | 9/2007 |
| FR | 2 900 841 | 11/2007 |
| WO | WO 2004/026441 A1 | 4/2004 |

OTHER PUBLICATIONS

Esp@cenet patent family listing for FR 2898284. Patent family list's presumed publication date: 2009.*

* cited by examiner

*Primary Examiner* — Daniel C McCracken
*Assistant Examiner* — Daniel Berns
(74) *Attorney, Agent, or Firm* — Antonelli, Terry, Stout & Kraus, LLP.

(57) ABSTRACT

The gaseous effluent to be treated is contacted in C1 with an absorbent solution selected for its property of forming two separable phases when it has absorbed an amount of acid compounds and when it is heated. The absorbent solution laden with acid compounds is then heated in E1 and E3 so as to separate two fractions in BS1: a first absorbent solution fraction depleted in acid compounds and a second absorbent solution fraction enriched in acid compounds. The second fraction is regenerated in C2 so as to release part of the acid compounds, and the first absorbent solution fraction and the regenerated absorbent solution are recycled as absorbent solution.

According to the invention, an absorbent solution portion circulating in C1 is cooled in E2 in order to prevent demixing of the solution in column C1.

18 Claims, 6 Drawing Sheets

GAS DEACIDIZING METHOD USING AN ABSORBENT SOLUTION WITH DEMIXING CONTROL

FIELD OF THE INVENTION

The present invention relates to the field of deacidizing a gaseous effluent by means of an absorbent solution.

The method according to the invention allows to remove the acid compounds, such as carbon dioxide ($CO_2$) and hydrogen sulfide ($H_2S$), contained in a gaseous effluent. It can be applied for treating a natural gas, a synthesis gas or fumes from a combustion process.

BACKGROUND OF THE INVENTION

Regeneration of an absorbent solution laden with acid compounds is costly, notably as regards energy consumption. This is a major drawback, notably when the absorbent solution is used to capture the $CO_2$ present in combustion fumes. In fact, if the heat required to regenerate the absorbent solution is obtained by combustion of a fossil fuel, an additional amount of $CO_2$ may be produced, which would make the capture of $CO_2$ by absorption uninteresting.

Document FR-2,898,284 aims to heat fractionate the absorbent solution laden with acid compounds into two parts, a part rich in acid compounds and a part poor in acid compounds, and to regenerate by distillation only the fraction that is enriched in acid compounds in order to minimize the energy required for regeneration of the absorbent solution. However, the heating of the absorbent solution generated by the exothermic reaction between the acid compounds and said absorbent solution can possibly cause separation of the absorbent solution into two phases in the absorption column. Such a situation would not allow optimum operating conditions for the process. The formation of two liquid phases in the absorption column would limit the transfer of acid compounds between the gas to be deacidized and the absorbent solution. The acid compounds could no longer be absorbed efficiently by the absorbent solution.

The present invention aims to control the demixing phenomenon in the absorption column by means of one or more cooling operations of the absorbent solution circulating in the absorption column, in order to prevent separation of the phases in the column and to obtain separation of the phases at a later stage of the deacidizing process.

SUMMARY OF THE INVENTION

In general terms, the invention describes a method of deacidizing a gaseous effluent comprising at least one acid compound of the group made up of hydrogen sulfide ($H_2S$) and carbon dioxide ($CO_2$), wherein the following stages are carried out:

a') selecting an absorbent solution that is a single phase when its temperature is below a critical temperature and that forms two separable liquid phases when it has absorbed an amount of acid compounds and is heated, and determining said critical temperature from which said absorbent solution divides into two liquid phases, a) contacting the gaseous effluent with an absorbent solution by feeding the gaseous effluent into the lower part of an absorption zone and by feeding the absorbent solution into the upper part of the absorption zone so as to obtain a gaseous effluent depleted in acid compounds and an absorbent solution laden with acid compounds, the absorbent solution being selected for its property of forming two separable liquid phases when it has absorbed an amount of acid compounds and when it is heated, b) carrying out at least one cooling of at least an absorbent solution portion circulating in the absorption zone, cooling being performed by indirect heat exchange with a cooling fluid, cooling being carried out until a temperature lower than a threshold temperature determined in such a way that the absorbent solution is a single-phase solution in the absorption zone, La it does not divide into two phases, is reached, c) heating the absorbent solution laden with acid compounds so that the absorbent solution divides into two liquid fractions: a first absorbent solution fraction depleted in acid compounds and a second absorbent solution fraction enriched in acid compounds, d) separating said two fractions obtained in stage b), e) regenerating the second fraction so as to release part of the acid compounds, f) recycling the first absorbent solution fraction and the regenerated absorbent solution as absorbent solution to stage a).

According to the invention, in stage b), said absorbent solution portion can also be cooled by heat exchange within the absorption zone.

In general terms, in stage b), the absorbent solution portion can be cooled to a temperature ranging between 0° C. and 70° C.

In stage c), the absorbent solution laden with acid compounds can be heated to a temperature ranging between 50° C. and 150° C.

In stage e), the second absorbent solution fraction can be distilled so as to produce a regenerated absorbent solution depleted in acid compounds by releasing acid compounds in gaseous form.

Stage a) can be carried out in a column, the first absorbent solution fraction and the regenerated absorbent solution being introduced at the top of the column.

Stage a) can be carried out in a column, the regenerated absorbent solution being introduced at the top of the column, the first absorbent solution fraction being introduced at an intermediate level between the bottom and the top of the column.

In stage d), one of the following separation techniques can be used: decantation, centrifugation, filtration.

The absorbent solution can comprise a reactive compound in aqueous phase, the reactive compound being selected from the group consisting of: amines, alkanolamines, polyamines, amino-acids, amino-acid alkaline salts, amides, ureas, alkali metal phosphates, carbonates and borates.

The gaseous effluent can be selected from the group made up of natural gas, synthesis gas, combustion fumes, refinery gas, Claus tail gas, biomass fermentation gas.

In stage b), said absorbent solution portion can be cooled to a temperature at least 10° C. below the critical temperature.

Temperature control through cooling in the absorption column allows to prevent absorbent solution demixing and thus to preserve the absorption performances of the solution.

BRIEF DESCRIPTION OF THE FIGURES

Other features and advantages of the invention will be clear from reading the description hereafter, with reference to the accompanying figures wherein.

DETAILED DESCRIPTION

Figure 1:
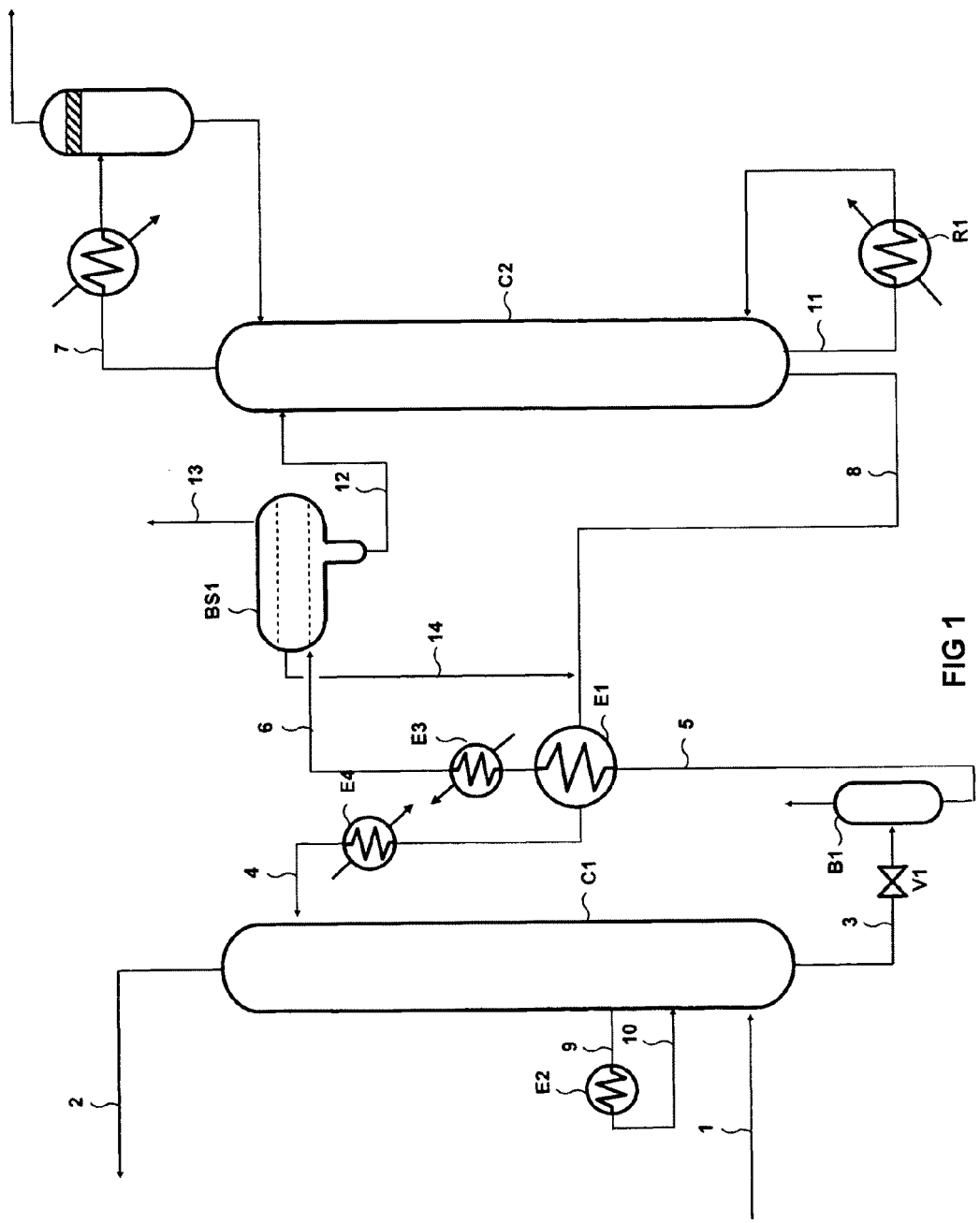
FIG. 1 shows an embodiment of the method according to the invention.

In FIG. 1, the gaseous effluent to be deacidized circulating in line 1 is contacted in absorption column C1 with the absorbent solution flowing in through line 4. The deacidizing method according to the invention can be applied to various gaseous effluents. For example, the method allows to decarbonate combustion fumes, to deacidize natural gas or a Claus tail gas. The method also allows to remove the acid compounds contained in synthesis gas, in conversion gas in integrated coal or natural gas combustion plants, and in the gas resulting from biomass fermentation.

In column C1, the reactive compounds of the absorbent solution react with the acid compounds to be collected so as to form a salt soluble in the solution. The gas depleted in acid compounds is discharged from C1 through line 2. The absorbent solution enriched in acid compounds in form of salts dissolved in water is discharged from C1 through line 3. This absorbent solution enriched in acid compounds however comprises a proportion of unreacted reactive compounds that may be significant.

The absorbent solution is an aqueous solution comprising one or more reactive compounds or having a physico-chemical affinity with acid compounds. An absorbent solution comprising compounds that react in a reversible manner with acid compounds such as $H_2S$ and $CO_2$ is preferably selected. According to the invention, one selects a reactive compound having the property of forming, in the aqueous phase, two separable liquid phases when it has absorbed a predetermined amount of acid compounds and when the temperature is above a critical temperature. In other words, the reactive compound is selected in such a way that the absorbent solution laden with acid compounds forms two liquid phases when its temperature exceeds a critical demixing temperature, i.e. a temperature threshold. When the temperature of the absorbent solution is lower than this critical temperature, the reactive compound in aqueous phase forms a single-phase solution. The composition of the absorbent solution used in the method according to the invention is detailed hereafter.

The demixing phenomenon takes place as a result of a temperature rise. The critical temperature at which this phenomenon occurs depends on the initial composition of the aqueous TMHDA solution.

Various complementary methods can be used to determine the critical temperature of an absorbent solution consisting of a mixture of reactive compounds and water:

determining the cloud temperature of solutions,
analyzing the composition of two phases at equilibrium.
Cloud Temperature:

This method consists in determining the temperature at which a cloudiness of the solution is observed, corresponding to the dispersion of a phase in the other.

In practice, absorbent solutions of different compositions were placed in a thermostat-controlled bath whose temperature was gradually raised until a cloudiness appeared. This method is precise within some degrees.

Phase Analysis:

This method consists in increasing the temperature so as to obtain a clear phase separation of the solution, then in sampling each phase to determine the amine and water concentration.

In practice, absorbent solutions of different compositions were placed in a thermostat-controlled bath whose temperature was raised until a clear phase separation was observed. Each phase was sampled and analyzed by acid or Karl-Fischer determination in order to determine the amine and water concentration.

Critical Temperature

Figure 5:
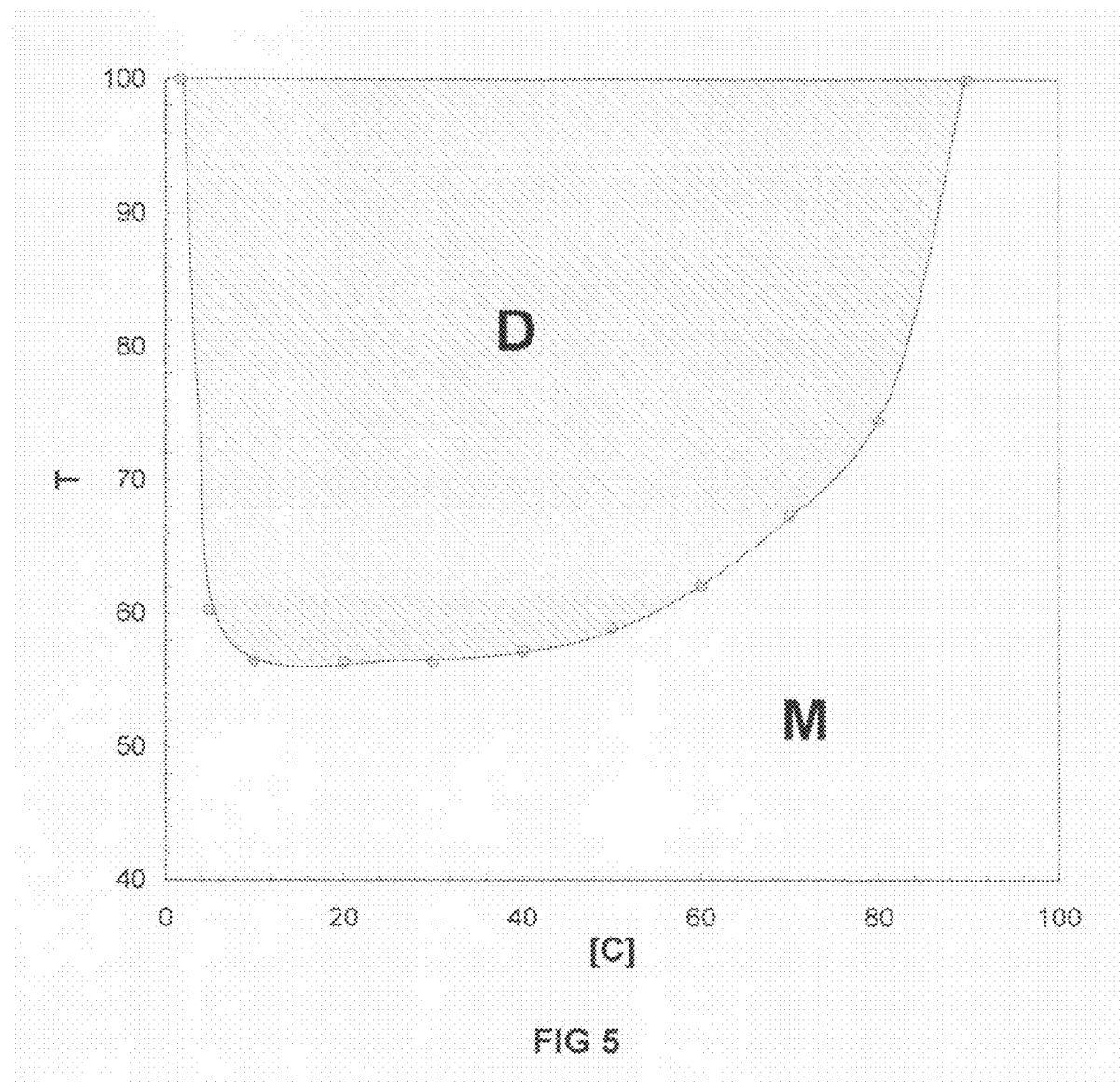
FIG. 5 shows the evolution curve of the critical demixing temperature as a function of the composition of the absorbent solution.

The graphical representation of data in a Temperature-Concentration diagram as shown in FIG. 5 allows to distinguish an area where the absorbent solutions according to the invention are single-phase solutions and an area where they are two-phase solutions. The limit of the area where they are two-phase solutions has a "parabolic shape" and it therefore admits a minimum for a critical solution, which is 57° C. for aqueous TMHDA solutions. Below this critical temperature, the water and the TMHDA are soluble in any proportion (Lower Critical Solubility Temperature LCST).

During contacting in C1, the temperature of the absorbent solution increases as the acid compounds contained in the gas are absorbed, as a result of the exothermic absorption reaction. In column C1, the temperature of the absorbent solution goes through a maximum that might exceed the critical demixing temperature and the absorbent solution therefore could divide into two phases. In form of two separate phases, the acid compound stream transferred from the gas to the solution would be greatly limited and would have to be compensated for by a high increase in the column height. In order to maintain the single-phase absorbent solution in column C1, the present invention aims to carry out one or more operations of cooling the absorbent solution during the absorption stage. Cooling is carried out by indirect heat exchange between the absorbent solution and a cooling fluid, i.e. cooling is performed without direct contact between the cooling fluid and the absorbent solution. Heat exchanges are carried out through a wall of a heat exchanger, the wall separating the absorbent solution from the cooling fluid. Cooling positioning in column C1 is selected is according to the temperature profile of the absorbent solution to guarantee efficient cooling thereof. Cooling generally has to be positioned at points where the temperature of the absorbent solution is maximum. The critical temperature from which the absorbent solution will start demixing depends on several parameters: the composition of the absorbent solution, the nature of the acid compounds absorbed and the charge rate, i.e. the number of moles of acid compounds that have reacted with one mole of absorbent compounds. The method according to the invention aims to cool the solution so as to always have the absorbent solution at a temperature below its critical temperature. According to the invention, the absorbent solution can be cooled to a temperature 2° C., preferably 5° C. or even 10° C. below the critical temperature.

For example, according to the invention, one or more withdrawals of a portion of the absorbent solution are carried out, the solution withdrawn is cooled by indirect heat exchange with a cooling fluid, then the absorbent solution is fed again into column C1.

Depending on the type of contact internals used, withdrawal plates can be arranged at different levels in the absorption column in order to collect the liquid absorbent solution at the desired levels. All or part of the liquid stream can be withdrawn in order to be cooled and fed again into the column at a lower level by means of a liquid distributor. For example, during withdrawal, between 20% and 100% of the absorbent solution stream circulating in the column can be drawn off. The absorbent solution portion withdrawn can be cooled to a temperature ranging between 0° C. and 70° C., preferably between 20° C. and 50° C.

In reference to FIG. 1, a portion of the absorbent solution circulating in C1 is withdrawn through line 9 to be cooled by exchanger E2. The absorbent solution is collected on withdrawal plates in C1 and all or part of the liquid stream is collected by means of a lateral liquid withdrawal in order to be cooled in E2. The plates are possibly equipped with downcomers so that the part of the absorbent solution that is not withdrawn can continue to circulate in the column by overspill. In heat exchanger E2, the absorbent solution can be cooled by indirect heat exchange with an ambient fluid, air or water for example. The cooled absorbent solution is sent through line 10 to column C1 in order to be contacted again with the acid gas in the contact zone, the acid gas being fed into C1 through a gas distributor.

Heat exchanger E2 has to cool the absorbent solution to a sufficiently low temperature to avoid demixing in C1. E2 can cool the solution to a temperature ranging between 0° C. and 70° C., preferably between 20° C. and 50° C. The absorbent solution withdrawal point is arranged so as to efficiently reduce to the maximum the temperature reached in the column, typically withdrawal is performed at the point where the temperature of the absorbent solution is maximum in C1.

Figure 2:
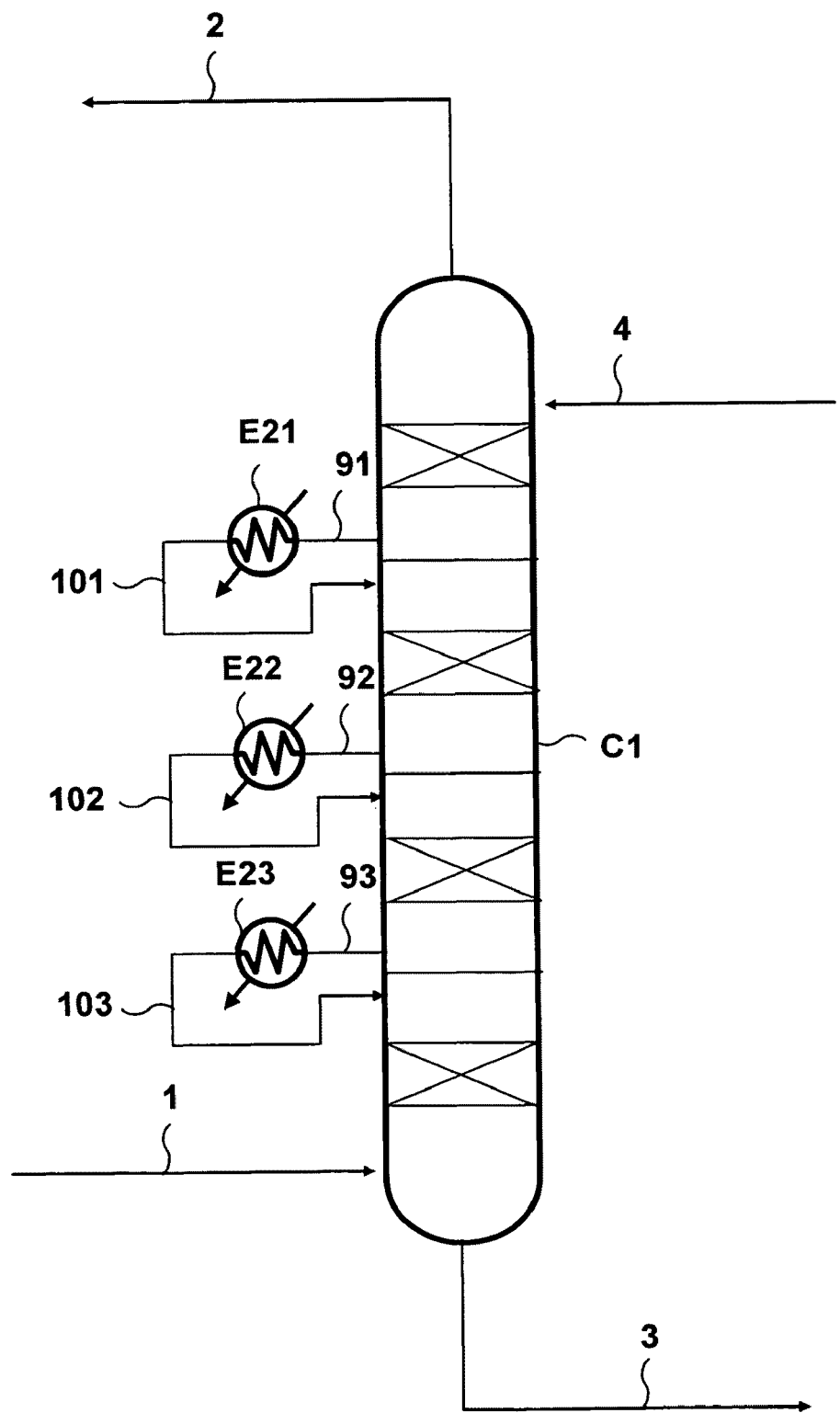
FIGS. 2, 3 and 4 diagrammatically show variants of the method of FIG. 1.

FIG. 2 shows column C1 of FIG. 1 wherein several absorbent solution withdrawals are carried out at various levels of C1. In reference to FIG. 2, a first absorbent solution portion is withdrawn through line 91, cooled in exchanger E21 and fed again into C1 through line 101. A second absorbent solution portion is withdrawn through line 92, cooled in exchanger E22 and fed again into C1 through line 102. A third absorbent solution portion is withdrawn through line 93, cooled in exchanger E23 and fed again into C1 through fine 103.

Figure 3:
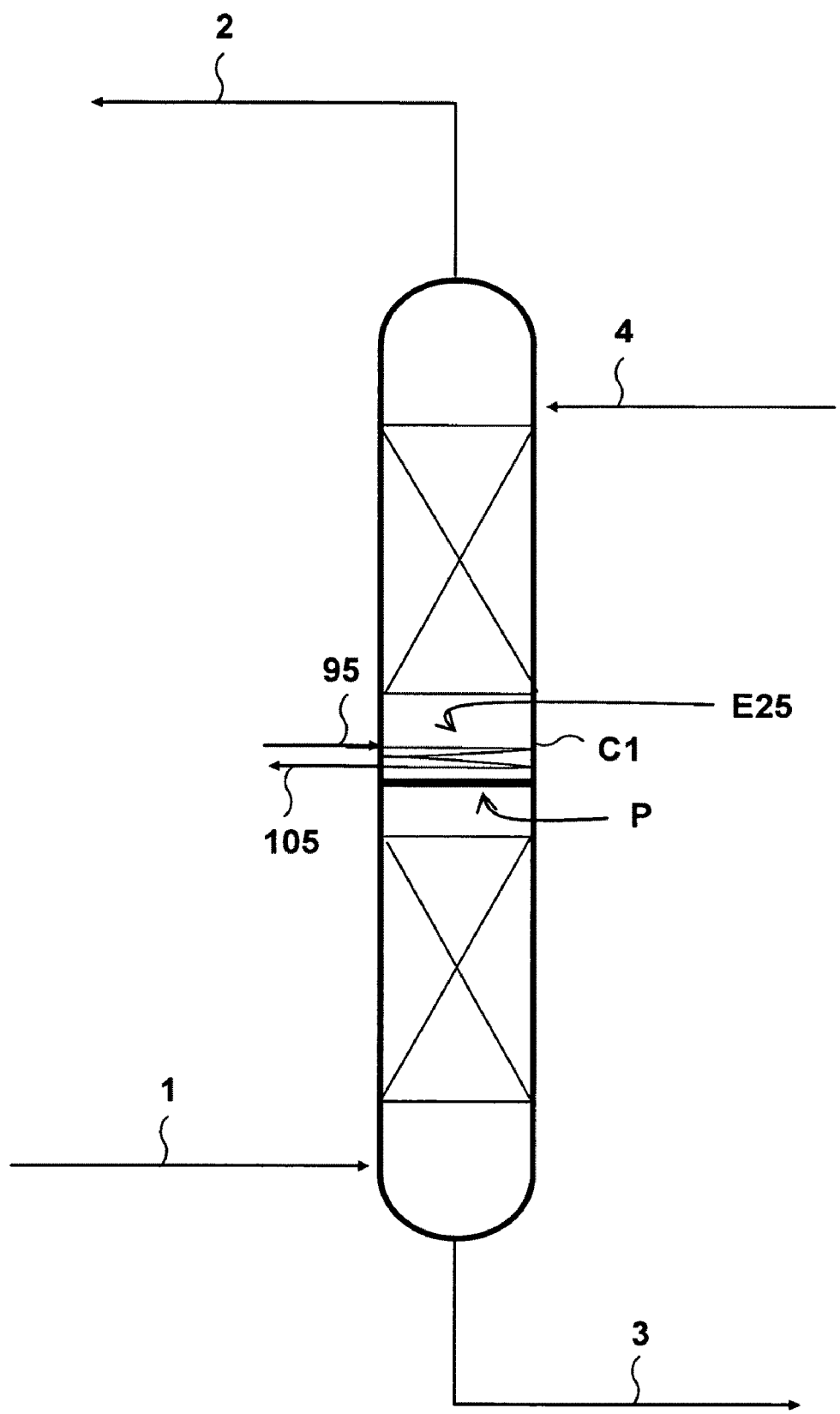

Alternatively, cooling of the absorbent solution can be carried out directly within column C1. FIG. 3 diagrammatically shows column C1 of FIG. 1 provided with a heat exchanger. The absorbent solution that flows through the contact zone at the top of column C1 is collected on a withdrawal plate P. Heat exchanger E25 is arranged above plate P so as to soak in the liquid collected by plate P. A refrigerant fluid flowing in through line 95 circulates in heat exchanger E25 to indirectly cool the absorbent solution collected by plate P. The absorbent solution can be cooled to a temperature ranging between 0° C. and 70° C., preferably between 20° C. and 50° C. The refrigerant fluid is then discharged from E25 through line 105. The cooled absorbent solution is homogeneously distributed in the contact zone located below plate P so as to continue absorption. One or more heat exchangers can generally be arranged in the column, the exchangers being laid out like E25.

In reference to FIG. 1, the absorbent solution circulating in line 3 can be expanded through expansion device V1 so as to vaporize part of the acid compounds absorbed and possibly co-absorbed hydrocarbons if the method according to the invention is used for natural gas deacidizing. The vapour fraction produced by the expansion in V1 is separated from the absorbent solution and discharged at the top of drum 131. Depending on its composition, this vapour fraction can be recycled upstream from the process, used as fuel gas or mixed with the stream circulating in line 7. Alternatively, notably in cases where the method according to the invention is applied to combustion fumes decarbonation, the absorbent solution may not undergo expansion and separation. In this case, line 3 is directly connected to line 5.

The absorbent solution is then sent through line 5 to heat exchanger E1, then E3. It is discharged therefrom at a higher temperature through line 6. In heat exchangers E1 and E3, the absorbent solution laden with acid compounds is heated until a higher temperature than the critical temperature at which the solution laden with acid compounds forms two separable liquid phases is reached. For example, the absorbent solution laden with acid compounds is heated to a temperature ranging between 50° C. and 150° C., preferably between 70° C. and 120° C. Thus, the fluid circulating in line 6 consists of two separable liquid phases: a phase rich in acid compounds and a phase poor in acid compounds. Furthermore, under the effect of the temperature rise, part of the acid compounds is released in gaseous form. The three phases of the fluid circulating in line 6 are separated in separating drum BS1. For example, the two liquid phases can be separated in BS1 through decantation, centrifugation or filtration. The gaseous fraction obtained at the top of BS1 is extracted through line 13 and possibly mixed with stream 7. A first liquid fraction enriched in acid compounds, i.e. enriched in active compounds having reacted with the acid compounds, is sent through line 12 to regeneration column C2. A second liquid fraction depleted in acid compounds, i.e. enriched in unreacted active compounds, is discharged from BS1 through line 14.

The first liquid fraction enriched in acid compounds circulating in line 12 is fed into column C2 to be regenerated. Column C2 is equipped with a reboiler R1, In C2, the reactive compounds of the absorbent solution are separated from the acid compounds. The acid compounds are released in gaseous form and discharged from C2 through line 7. Acid gas stream 7 is partly condensed by cooling and the condensates are sent to C2 as reflux. Part of the absorbent solution is withdrawn at the bottom of column C2 through line 11 to be heated by reboiler R1 and fed again into the bottom of column C2 through line 8.

It is possible to increase the pressure at which regeneration is carried out in C2 so as to obtain acid gases under pressure, thus reducing the energy cost and consumption of the acid gas compression plant when these gases are to be re-injected into the subsoil.

The heat released by cooling the absorbent solution collected at the bottom of column C2 can be recovered in order to heat various streams to be regenerated. For example, in reference to FIG. 1, the absorbent solution circulating in line 8 allows to heat, in indirect heat exchanger E1, the absorbent solution laden with acid compounds circulating in line 5. This solution is then cooled by exchanger E4 to the operating temperature of column C1 prior to being fed into C1 through line 4.

The nature of the reactive compounds of the absorbent solution can be selected depending on the nature of the acid compound(s) to be treated to allow a reversible chemical reaction with the acid compound(s) to be treated. The chemical structure of the reactive compounds can also be selected so as to furthermore obtain increased stability of the absorbent solution under the conditions of use.

The reactive compounds can be, by way of non limitative example, (primary, secondary, tertiary, cyclic or not, aromatic or not, saturated or not) amines, alkanolamines, polyamines, amino-acids, amino-acid to alkaline salts, amides, ureas, alkali metal phosphates, carbonates or borates.

For example, the following reactive compound can be used: N,N,N',N'-Tetramethylhexane-1,6-diamine, commonly referred to as TMHDA.

The reactive compounds can be in variable concentration, for example ranging between 10% and 90% by weight, preferably between 15% and 60% by weight, more preferably between 20% and 50% by weight, in the aqueous solution.

The absorbent solution can contain between 10% and 90% by weight of water.

In an embodiment, the reactive compounds of the absorbent solution can be mixed with another amine, containing at least one primary or secondary amine function so as to act as an activator. The absorbent solution can contain activator up to a concentration of 20% by weight, preferably less than 15% by weight and more preferably less than 10% by weight.

This type of formulation is particularly interesting in the case of $CO_2$ capture in industrial fumes, or treatment of natural gas containing $CO_2$ above the desired specification. In fact, for this type of application, one wants to increase the $CO_2$ capture kinetics in order to reduce the size of the equipments.

A non-exhaustive list of compounds that can be used as activators is given below:
MonoEthanolAmine,
AminoEthylEthanolAmine,
DiGlycolAmine,
piperazine,
N-(2-HydroxyEthyl)piperazine,
N-(2-AminoEthyl)piperazine,
N-Methylpiperazine,
N-Ethylpiperazine,
N-Propylpiperazine,
1,6-HexaneDiAmine,
1,1,9,9-TetraMethylDiPropyleneTriamine,
Morpholine,
Piperidine,
3-(MethylAmino)PropylAmine,
N-MethylBenzylAmine.

In an embodiment, the absorbent solution, in particular an absorbent solution based on N,N,N',N'-Tetramethylhexane-1,6-diamine, can also contain other organic compounds. Thus, the absorbent solution according to the invention can contain organic compounds that are not reactive towards acid compounds (commonly referred to as "physical solvent") and that allow to increase the solubility of at least one or more acid compounds of the gaseous effluent. For example, the absorbent solution can comprise between 5% and 50% by weight of physical solvent such as alcohols, glycol ethers, lactames, N-alkylated pyrrolidones, N-alkylated piperidones, cyclotetramethylenesulfone, N-alkylformamides, N-alkylacetamides, ether-ketones or alkyl phosphates and derivatives thereof. By way of non limitative example, it can be methanol, tetraethyleneglycoldimethylether, sulfolane or N-formyl morpholine.

In an embodiment, the absorbent solution, in particular an absorbent solution based on N,N,N',N'-Tetramethylhexane-1,6-diamine, can also comprise an organic or inorganic acid. A non-exhaustive list of acid compounds that can be used is given below:
formic acid
oxalic acid
acetic acid
propanoic acid
butanoic acid
amino-acid (Glycine, Taurine, etc.)
phosphoric acid
phosphorous acid
pyrophosphoric acid
sulfuric acid
sulfurous acid
nitrous acid
hydrochloric acid.

In some cases, it may be desirable to recycle an absorbent solution very poor in acid compounds, i.e. with a high absorption capacity, to the top of column C1 so as to increase the acid compound removal efficiency and to reach advanced specifications on the gas treated. For example, the absorbent solution fraction depleted in acid compounds separated in separating drum BS1 may not be efficient enough to collect acid compounds. Thus, in some cases, the absorbent solution fraction depleted in acid compounds from drum BS1 can be preferably sent to an intermediate point of absorption column C1, as diagrammatically shown in FIG. 4. In this case, only the absorbent solution fraction regenerated in C2 is sent to the top of column C1

Figure 4:
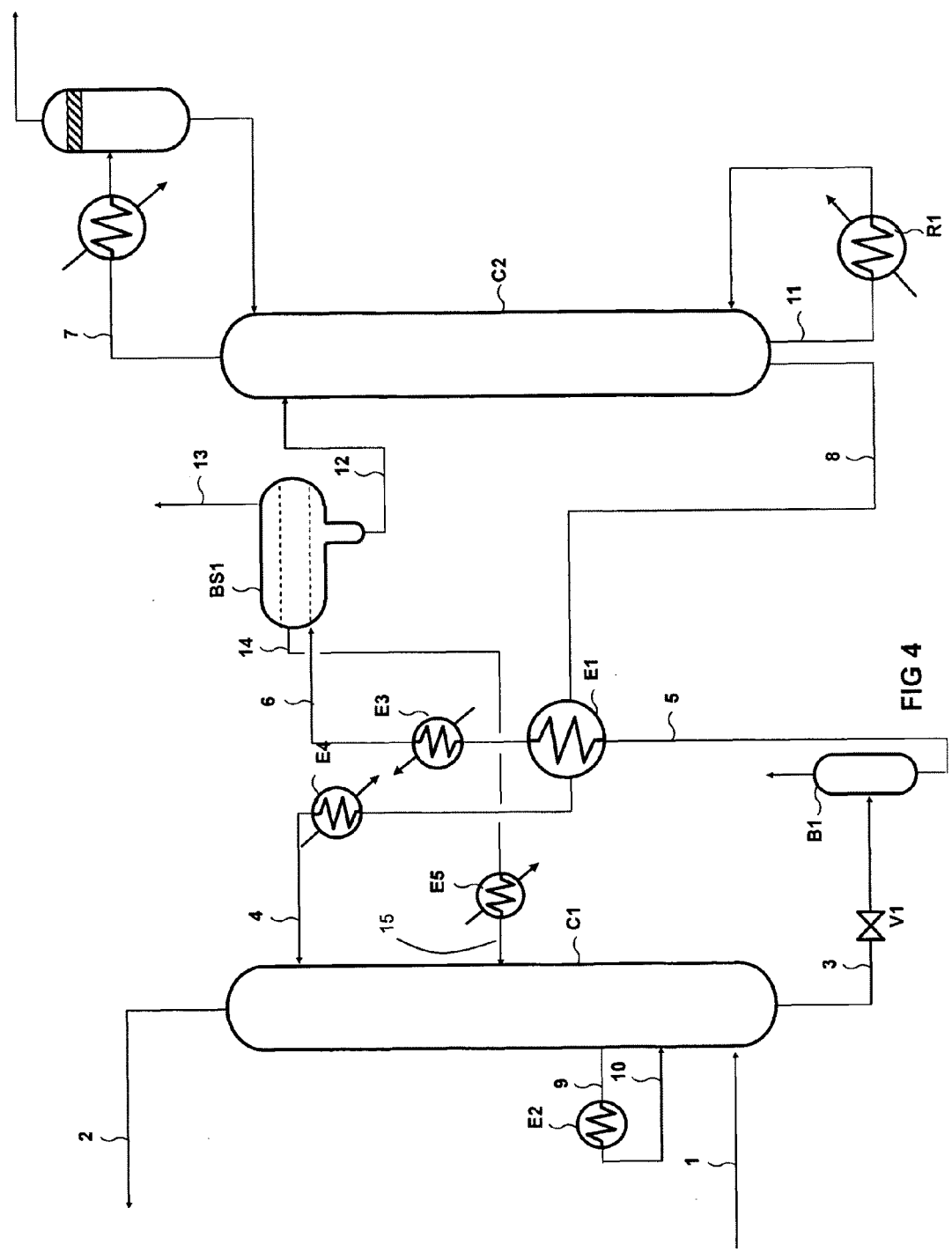

The reference numbers of FIG. 4 identical to those of FIG. 1 designate the same elements.

In FIG. 4, the second absorbent solution fraction depleted in acid compounds coming from BS1 through line 14 is cooled by heat exchange in E5 and fed through line 15 to an intermediate point of absorption column C1, Line 15 allows to inject the absorbent solution into C1 between the bottom and the top of the column, at a lower level than the inlet point through line 4.

The regenerated absorbent solution obtained at the bottom of column C2 is sent, after passage through devices E1 and E4, to the top of column C1 through line 4.

The numerical examples hereafter allow to illustrate the present invention.

FIG. 5 shows an example of evolution of the critical demixing temperature T as a function of the concentration (C) in TMHDA (N,N,N',N'-Tetramethylhexane-1,6-diamine) for an absorbent solution consisting of TMHDA in aqueous solution that has absorbed no acid compounds. Domain M indicates the temperature and concentration conditions for which the absorbent solution is a single-phase solution. Domain D indicates the temperature and concentration conditions for which the absorbent solution is a two-phase solution. In this case, according to the invention, one tries to keep an absorbent solution temperature below 56° C. in the absorption zone in order to remain within single-phase domain M.

Figure 6:
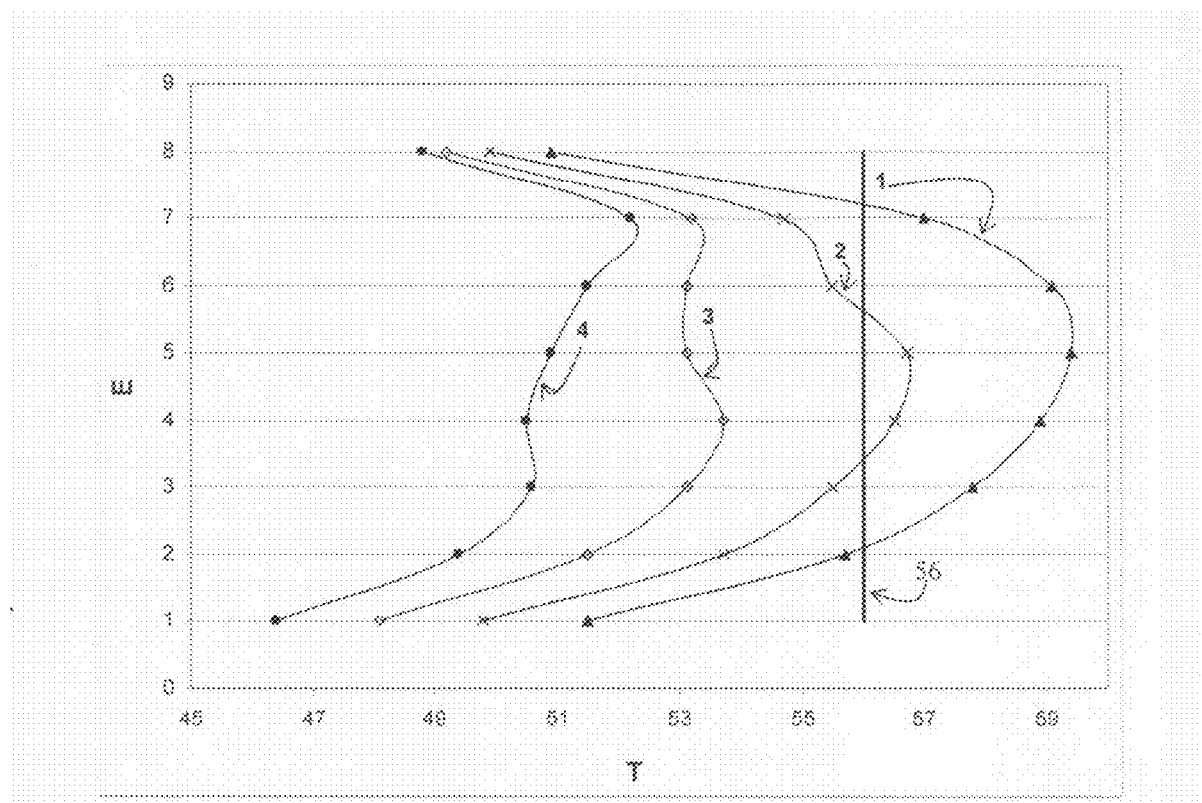
FIG. 6 shows temperature profiles in an absorption column.

The operation mode of the present invention is illustrated by the numerical example described hereafter in reference to FIG. 6. FIG. 6 shows an example of the influence of cooling an absorbent solution on the temperature profile T according to the stages E in the absorption column, in a process of the type described in reference to FIG. 1.

For the case studied, a column made up of 8 theoretical stages is necessary for separation of 90% of the acid compounds contained in the feed gas introduced in the column. The absorbent solution consists of 33 wt. % TMHDA dissolved in water. The characteristics of the feed gas are given in Table 1 hereunder,

TABLE 1

| Feed gas | |
| --- | --- |
| Flow rate | 78 500 kmole/h |
| Pressure | 1 bar |
| Temperature | 40° C. |
| Composition | |
| N2 (% mol) | 79.5 |
| CO2 (% mol) | 13.5 |
| H2O (% mol) | 7 |

FIG. 6 shows four curves corresponding to the operation of four columns with the following configurations:
curve 1 corresponds to an absorption column according to the prior is art, i.e. without lateral withdrawal to cool the liquid,
curve 2 corresponds to an absorption column as described by FIG. 1 or 3, i.e. with cooling,
curve 3 corresponds to an absorption column with two cooling devices, curve 4 corresponds to an absorption column with three cooling devices as shown in FIG. 2, Table 2 below gives the results obtained.

TABLE 2

|  | Curve 1 | Curve 2 | Curve 3 | Curve 4 |
|---|---|---|---|---|
| Withdrawal | no | plate 7 | plates 7 and 6 | plates 6, 7 and 8 |
| Cooled solution temperature | — | 40° C. | 40° C. | 40° C. |
| Solution fraction withdrawn (% mol) | 0 | 30% | 2 × 30% | 3 × 30% |
| Max temperature | 59.4° C. | 56.7° C. | 53.7° C. | 52.2° C. |

It can be clearly seen in FIG. 6 that 2 absorbent solution cooling operations, at stages 6 and 7, were necessary to maintain the temperature of the absorbent solution at a value below 56° C., as shown by line 56.

The invention claimed is:

1. A method of deacidizing a gaseous effluent comprising at least one acid compound of the group made up of hydrogen sulfide ($H_2S$) and carbon dioxide ($CO_2$), wherein the following stages are carried out:
   a') selecting an absorbent solution that is a single phase when its temperature is below a critical temperature and that forms two separable liquid phases when it has absorbed an amount of acid compounds and is heated, and determining the critical temperature from which the absorbent solution divides into two liquid phases,
   a) contacting the gaseous effluent with the absorbent solution by feeding the gaseous effluent into a lower part of an absorption zone and by feeding the absorbent solution into an upper part of the absorption zone so as to obtain a gaseous effluent depleted in acid compounds and an absorbent solution laden with acid compounds, the absorbent solution being selected for its property of forming two separable liquid phases when it has absorbed an amount of acid compounds and when it is heated,
   b) carrying out at least one cooling of at least an absorbent solution portion circulating in the absorption zone, cooling being performed by indirect heat exchange with a cooling fluid, cooling being carried out until a temperature of all the absorbent solution in the absorption zone reaches a temperature lower than the critical temperature such that all the absorbent solution is a single-phase solution in the absorption zone, and is not divided into two phases,
   c) heating the absorbent solution laden with acid compounds so that the absorbent solution divides into two liquid fractions: a first absorbent solution fraction depleted in acid compounds and a second absorbent solution fraction enriched in acid compounds,
   d) separating the two fractions obtained in stage c),
   e) regenerating the second fraction so as to release part of the acid compounds to obtain a regenerated absorbent solution,
   f) recycling the first absorbent solution fraction and the regenerated absorbent solution as absorbent solution to stage a).

2. A method as claimed in claim 1 wherein, in stage b), at least one withdrawal of a portion of the absorbent solution from the absorption zone is carried out, the absorption solution portion is cooled to a temperature below the critical temperature and the cooled absorbent solution portion is fed again into the absorption zone.

3. A method as claimed in claim 2 wherein, in stage b), at least two absorption solution withdrawals are carried out at different levels in the absorption zone.

4. A method as claimed in claim 2, wherein the absorption zone is inside an absorption column, and upon each withdrawal carried out in stage b), between 20% and 100% of the absorbent solution stream fed into the absorption column are withdrawn.

5. A method as claimed in claim 1 wherein, in stage b), the absorbent solution portion is cooled by heat exchange within the absorption zone.

6. A method as claimed in claim 1 wherein, in stage b), the absorbent solution portion is cooled to a temperature ranging between 0° C. and 70° C.

7. A method as claimed in claim 1 wherein, in stage c), the absorbent solution laden with acid compounds is heated to a temperature ranging between 50° C. and 150° C.

8. A method as claimed in claim 1 wherein, in stage e), the second absorbent solution fraction is distilled so as to produce the regenerated absorbent solution depleted in acid compounds by releasing acid compounds in gaseous form.

9. A method as claimed in claim 1, wherein stage a) is carried out in a column, the first absorbent solution fraction and the regenerated absorbent solution being introduced at a top of the column.

10. A method as claimed in claim 1, wherein stage a) is carried out in a column, the regenerated absorbent solution being introduced at a top of the column, the first absorbent solution fraction being introduced at an intermediate level between a bottom and the top of the column.

11. A method as claimed in claim 1 wherein, in stage d), one of the following separation techniques is used: decantation, centrifugation, filtration.

12. A method as claimed in claim 1, wherein the absorbent solution comprises a reactive compound in aqueous phase, the reactive compound being selected from the group consisting of: amines, alkanolamines, polyamines, amino-acids, amino-acid alkaline salts, amides, ureas, alkali metal phosphates, carbonates and borates.

13. A method as claimed in claim 1, wherein the gaseous effluent is selected from the group consisting of natural gas, synthesis gas, combustion fumes, refinery gas, Claus tail gas, and biomass fermentation gas.

14. A method as claimed in claim 1 wherein, in stage b), the absorbent solution portion is cooled to a temperature at least 2° C. below the critical temperature.

15. A method as claimed in claim 1, wherein the absorption zone resides inside a column, and in stage b) the cooling is carried out until a temperature of all the absorbent solution in the column reaches a temperature lower than the critical temperature such that all the absorbent solution is a single-phase solution in the column, and is not divided into two phases.

16. A method as claimed in claim 1 wherein, in stage a), determining the critical temperature from which the absorbent solution divides into two liquid phases includes identifying the composition of the absorbent solution, identifying the acid compounds in the absorption zone, and determining a ratio of an amount of the acid compounds to have reacted with an amount of the absorbent solution in the absorption zone.

17. A method as claimed in claim 1, wherein the absorption zone resides inside a column,
   in stage a), determining the critical temperature from which the absorbent solution divides into two liquid phases includes identifying the composition of the absorbent solution, identifying the acid compounds in the column, and determining a ratio of an amount of the acid compounds to have reacted with an amount of the absorbent solution in the column, and in stage b) the cooling is carried out until a temperature of all the absorbent solution in the column reaches a temperature lower than the critical temperature such that all the absorbent solution is a single-phase solution in the column, and is not divided into two phases.

18. A method of deacidizing a gaseous effluent comprising at least one acid compound of the group made up of hydrogen sulfide ($H_2S$) and carbon dioxide ($CO_2$), wherein the following stages are carried out:

a') selecting an absorbent solution that is a single phase when its temperature is below a critical temperature and that forms two separable liquid phases when it has absorbed an amount of acid compounds and is heated, and determining the critical temperature from which the absorbent solution divides into two liquid phases, a) contacting the gaseous effluent with the absorbent solution by feeding the gaseous effluent into a lower part of an absorption column and by feeding the absorbent solution into an upper part of the absorption column so as to obtain a gaseous effluent depleted in acid compounds and an absorbent solution laden with acid compounds, the absorbent solution being selected for its property of forming two separable liquid phases when it has absorbed an amount of acid compounds and when it is heated, b) maintaining all the absorbent solution in the absorption column in a single phase and at a temperature below the critical temperature by cooling at least a portion of the absorbent solution circulating in the absorption column by indirect heat exchange with a cooling fluid, c) heating the absorbent solution laden with acid compounds so that the absorbent solution divides into two liquid fractions: a first absorbent solution fraction depleted in acid compounds and a second absorbent solution fraction enriched in acid compounds, d) separating the two fractions obtained in stage c), e) regenerating the second fraction so as to release part of the acid compounds to obtain a regenerated absorbent solution, f) recycling the first absorbent solution fraction and the regenerated absorbent solution as absorbent solution to stage a), wherein, in stage a), determining the critical temperature from which the absorbent solution divides into two liquid phases includes identifying the composition of the absorbent solution, identifying the acid compounds in the absorption column, and determining a ratio of an amount of the acid compounds to have reacted with an amount of the absorbent solution in the absorption column.

* * * * *